United States Patent
Boss et al.

(10) Patent No.: US 10,922,478 B2
(45) Date of Patent: *Feb. 16, 2021

(54) DYNAMIC EDITING OF DATA REPRESENTATIONS USING CASCADING WEIGHTS

(71) Applicant: International Business Machines Corporation, Armonk, NY (US)

(72) Inventors: Gregory J. Boss, Saginaw, MI (US); Michele P. Brignull, Essex Junction, VT (US); Rick A. Hamilton, II, Charlottesville, VA (US); Janna K. Jacobson, Bellingham, WA (US); Anne R. Sand, Canon City, CO (US)

(73) Assignee: International Business Machines Corporation, Armonk, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/616,536

(22) Filed: Feb. 6, 2015

(65) Prior Publication Data
US 2015/0154276 A1 Jun. 4, 2015

Related U.S. Application Data

(63) Continuation of application No. 12/612,222, filed on Nov. 4, 2009, now Pat. No. 9,058,314.

(51) Int. Cl.
*G06F 17/00* (2019.01)
*G06F 40/166* (2020.01)
(Continued)

(52) U.S. Cl.
CPC .......... *G06F 40/166* (2020.01); *G06F 16/284* (2019.01); *G06F 40/18* (2020.01)

(58) Field of Classification Search
CPC ........ G06F 17/24; G06F 40/166; G06F 40/18; G06F 16/284
(Continued)

(56) References Cited

U.S. PATENT DOCUMENTS 5,095,429 A * 3/1992 Harris .................. G06F 17/246
705/35
5,844,572 A * 12/1998 Schott .................. G06F 3/0481
345/440

(Continued)

OTHER PUBLICATIONS

InfoSoft Global, PowerCharts—Data Driven and Interactive Flash Charts and Graphs, PowerCharts V3, http://www.fusioncharts.com/PowerCharts/Default.asp, 4 pages, Oct. 30, 2009.

(Continued)

*Primary Examiner* — Andrew T McIntosh
(74) *Attorney, Agent, or Firm* — Konrad Raynes Davda & Victor LLP; Janaki K. Davda

(57) ABSTRACT

A method and system for representing data includes providing a data representation according to defined variables and a functional relationship between the defined variables and receiving an assigned weight assigned to a defined variable. The method includes receiving a modification of a selected defined variable, and providing a further data representation according to a recalculation of an unselected defined variable, based upon the functional relationship, the assigned weight and the modified variable. Assigned weights and a plurality of modifications of the weighted variable are received. A further data representation is provided according to a further recalculation of the weighted variable based upon a weight selected from the assigned weights according to a previous modification of the weighted variable. The recalculating is performed according to a number of modifications performed since the previous modification of the (Continued)

weighted variable and according to a period of time since the previous modification of the weighted variable.

18 Claims, 7 Drawing Sheets

(51) Int. Cl.
 *G06F 16/28* (2019.01)
 *G06F 40/18* (2020.01)
(58) Field of Classification Search
 USPC .......................................................... 715/222
 See application file for complete search history.

(56) References Cited

U.S. PATENT DOCUMENTS

| 6,268,782 | B1 | 7/2001 | Hartmann et al. |
| 7,268,782 | B2 | 9/2007 | Ebert |
| 7,302,284 | B2* | 11/2007 | Baker, Jr. ............ A61B 5/02416 600/323 |
| 7,369,127 | B1 | 5/2008 | Hull |
| 9,058,314 | B2 | 6/2015 | Boss et al. |
| 2005/0114510 | A1* | 5/2005 | Error ..................... G06Q 30/02 709/225 |
| 2008/0276161 | A1* | 11/2008 | Slavens ................. G06F 17/246 715/213 |
| 2010/0262560 | A1* | 10/2010 | Murthy .................. G06Q 10/06 705/36 R |

OTHER PUBLICATIONS

Advanced data visualization solutions for Visual Studio, Silverlight and WPF, Generating Silverlight Content with Chart FX, http://www.softwarefx.com/sfxNetProducts/ChartFX/silverlight/tutorial.aspx, 2 pages, Oct. 30, 2009.

IBM TDB, Use of Mouse Dragging for Manipulating Graphs, webpage, IP.com, Inc. (Mar. 18, 2005).
Moowinx, Create interactive flash the moowinx wayl, webpage, moowinx.com (Dec. 1990).
Bianchi, S.B. et al., "Use of Mouse Dragging for Manipulating Graphs", IP.com No. IPCOM000103479D, Research Disclosure, No. 320, Dec. 1, 1990 (Original Publication date), Mar. 18, 2005 (IP.Com Electronic Publication date), 2 pp.
Moowinx, "Create Interactive Flash the Moowinx Way!", [online], [Retrieved on Oct. 30, 2009], Retrieved from the Internet at <URL: http://www.moowinx.com/index.php?cccpage=demos&set_language-en>, 4 pp.
Office Action 1 for U.S. Appl. No. 12/612,222, dated Dec. 19, 2012, 18 pp. [57.386 (OA1)].
Response to Office Action 1 for U.S. Appl. No. 12/612,222, dated Mar. 19, 2013, 9 pp. [57.386 (ROA1)].
Final Office Action 1 for U.S. Appl. No. 12/612,222, dated May 28, 2013, 16 pp. [57.386 (FOA1)].
Response to Final Office Action 1 for U.S. Appl. No. 12/612,222, dated Jul. 25, 2013, 8 pp. [57.386 (RFOA1)].
Advisory Action 1 for U.S. Appl. No. 12/612,222, dated Aug. 12, 2013, 4 pp. [57.386 (AdvAct1)].
Office Action 3 for U.S. Appl. No. 12/612,222, dated Oct. 2, 2013, 16 pp. [57.386 (OA3)].
Response to Office Action 3 for U.S. Appl. No. 12/612,222, dated Oct. 17, 2013, 10 pp. [57.386 (ROA3)].
Final Office Action 2 for U.S. Appl. No. 12/612,222, dated Dec. 27, 2013, 16 pp. [57.386 (FOA2)].
Response to Final Office Action 2 for U.S. Appl. No. 12/612,222, dated Jan. 22, 2014, 10 pp. [57.386 (RFOA2)].
Advisory Action 2 for U.S. Appl. No. 12/612,222, dated Feb. 10, 2014, 4 pp. [57.386 (AdvAct2)].
Appeal Brief for U.S. Appl. No. 12/612,222, dated May 5, 2014, 20 pp. [57.386 (ApplBrief)].
Notice of Allowance 1 for U.S. Appl. No. 12/612,222, dated Sep. 22, 2014, 8 pp. [57.386 (NOA1)].
Notice of Allowance 2 for U.S. Appl. No. 12/612,222, dated Feb. 17, 2015, 9 pp. [57.386 (NOA2)].

* cited by examiner

DYNAMIC EDITING OF DATA REPRESENTATIONS USING CASCADING WEIGHTS

CROSS-REFERENCE TO RELATED APPLICATION

Under 35 U.S.C. 120, this application is a Continuation application and claims priority to U.S. application Ser. No. 12/612,222, filed Nov. 4, 2009, entitled "DYNAMIC EDITING OF DATA REPRESENTATIONS USING CASCADING WEIGHTS," which is incorporated herein by reference.

BACKGROUND

This invention relates generally to field of data representations and, in particular, the field of editing representations of data.

It is known to provide editing capabilities for graphical representations of data. For example, it is known to permit a user to click and drag a bar on a bar chart in order to increase or decrease the length of the bar as it is displayed on a graphical representation, in order to indicate changes in the value represented by the bar. It is also known to permit a user to enter a functional relationship between variables represented on a bar chart. Users can also alter one bar of the bar chart, and have another bar recalculated and redisplayed according to the functional relationship and the alteration. Examples of editing capabilities provided for graphical representations of this type include Moowinx. Another example of such editing capabilities is Fusion Charts provided by InfoSoft Global. Additionally, useful data visualization solutions are provided by Visual Studio, Silverlight, WPF and SoftwareFX. Editing of radar charts is shown in U.S. Pat. No. 6,268,782. Furthermore, many CAD/CAM programs allow users to graphically edit designs.

U.S. Pat. No. 7,369,127 issued to Hull discloses dynamic control of graphical representations of data. In the Hull system a user can select parts of a graphical display, such as tick marks, offset bars, scale values, combination bars, or an entire graphical representation itself. The selected parts of the graphical representations can be unsealed, repositioned and resealed. Furthermore, the repositioning process can be performed with or without rescaling of the underlying data. Multiple series of data can be viewed, moved and rescaled in order to determine trends in the data and relationships between or among series of data.

U.S. Pat. No. 5,844,572 issued to Schott discloses a method and system for altering data by manipulation of representational graphs. In the method and system disclosed by Schott a user can directly manipulate the shapes of graphical representations. The manipulations can alter the corresponding underlying data as well as the graphical representations. Furthermore, the user of the Schott method and system can manipulate the relationships between associated data and receive recalculated graphical representations. Additionally, various data representation elements within the graphical representation can be focused and unfocused. The focused data representation elements can be reconfigured using scaling factors, while the unfocused data representation elements can remain in a constant configuration. Data representation elements can be focused and unfocused by the user or automatically by the system.

However, the foregoing prior art does not permit users to place specific constraints on how recalculated portions of graphical representations can change in response to alterations of other portions of the graphical representation.

SUMMARY

A method for representing data includes providing a data representation in accordance with defined variables and a functional relationship between the defined variables received from a user, receiving an assigned weight assigned to a defined variable, and receiving a modification of a selected defined variable to provide a modified variable. A further data representation is provided in accordance with a recalculation of an unselected defined variable based upon the functional relationship, the assigned weight and the modified variable. A plurality of assigned weights assigned to a weighted variable and a plurality of modifications of the weighted variable are received. A further data representation is provided in accordance with a further recalculation of the weighted variable based upon a weight selected from the plurality of assigned weights in accordance with a previous modification of the weighted variable. Recalculating in accordance with a number of modifications performed since the previous modification of the weighted variable, recalculating in accordance with a period of time since the previous modification of the weighted variable, and recalculating the unselected defined variable in accordance with a permitted range of values are also provided. A further data representation is provided in accordance with the permitted range of values.

A variable defined as a dependent variable and a variable defined as an independent variable are received. At least one of the dependent variable or the independent variable is locked. The data representation can be a graphical representation. The data representation can be a spreadsheet representation and the spreadsheet representation can be modified in accordance with a modification of the spreadsheet graphical representation. A modification of a graphical representation is performed in accordance with the modification of the spreadsheet representation.

A system for representing data includes a data representation in accordance with defined variables and a functional relationship received from a user, an assigned weight assigned to a defined variable, and a modified variable provided by a modification of a selected defined variable. The system also includes a further data representation provided in accordance with a recalculation of an unselected defined variable based upon the functional relationship, the assigned weight and the modified variable. A plurality of assigned weights assigned to a weighted variable, a plurality of modifications of the weighted variables, and a further data representation provided in accordance with a further recalculation of the unselected defined variable based upon a weight selected from the plurality of assigned weights in accordance with a previous modification of the weighted variable can be included.

A recalculation can be performed in accordance with a number of modifications performed since the previous modification of the weighted variable, and the recalculation can be performed in accordance with a period of time since the previous modification of the weighted variable. A range of values can be permitted for recalculating the at least one unselected defined variable, and a further data representation is provided in accordance with the recalculated at least one unselected defined variable. A received dependent variable and a received independent variable are used in performing the recalculations, and the received variables can include one or more of the group consisting of a locked dependent variable, a weighted dependent variable, a locked independent variable and a weighted independent variable.

In a further embodiment, a method for representing data includes receiving variable definitions to provide defined variables, receiving at least one functional relationship between the defined variables to provide a received functional relationship, and providing a representation of the defined variables according to the received functional relationship. The method also includes receiving at least one weight assigned to at least one defined variable to provide an assigned weight, receiving a modification of a selected defined variable to provide a graphically modified variable, and recalculating at least one unselected defined variable according to the received functional relationship and the assigned weight. A further representation is provided according to the graphically modified variable and the recalculating.

Modifications of a plurality of selected defined variables are received to provide a plurality of graphically modified variables, and a first plurality of weights assigned respectively to corresponding graphically modified variables of the plurality of graphically modified variables is received. Further graphically modified variables of the plurality of graphically modified variables are recalculated according to their corresponding assigned weights of the first plurality of weights, and a further representation is provided according to the further recalculating.

A second plurality of weights assigned respectively to the corresponding graphically modified variables of the plurality of graphically modified variables is received, and further graphically modified variables of the plurality of graphically modified variables are calculated according to their corresponding assigned weight of the second plurality of weights. A further representation is provided according to the second plurality of weights. The modifications of the plurality of selected defined variables can be an iterative series of modifications including assigning the weights of the first and second pluralities of weights in a predetermined sequence. A permitted range of values for recalculating the at least one unselected defined variable can be received, and a further representation can be provided according to the recalculated at least one unselected defined variable. A variable defined as a dependent variable and a variable defined as an independent variable can be received. The dependent defined variable can be locked. The independent defined variable can be locked. The modification of the selected defined variable can include clicking and dragging a graphical representation of the selected variable.

A method is disclosed for editing representations of data. A user can edit variables, including input and output variables, represented on graphical representations. The variable can be edited, for example, by clicking and dragging portions or selected features of the representations, such as point, lines, bars and other graphical features or by altering items in a spreadsheet. As users edit the variables, the effects of the user's editing changes on other variables can be automatically calculated by the inventive method. The automatic calculations can be performed according to relationships entered by a user, and altered representations can be graphically displayed accordingly.

For example, if a user edits a bar chart according to the invention, the user can select a bar representing a variable (e.g. price, cost, profit) by, for example, clicking on it. The user can then elongate or shrink the selected bar by dragging it up or down. For each value of the variable represented by the edited bar as it is varied in this manner, other variables represented by other bars on the bar chart can be recalculated according to the relationships between the variables defined by the user. As the other variables are recalculated the lengths of the bars representing the recalculated variables can be altered accordingly. However, in keeping with the system and method of the invention, the recalculations of the variables according to the relationships defined by the user can be constrained according to user determined locks and weights, wherein a lock can prevent one or more variables from being changed during the recalculations, and a weight can constrain the amount one or more variables can be changed during the recalculations.

In this manner, the user can use the system and method of the invention to edit any types of representations. Additionally, the user can dynamically update any associated data points shown in the representations according to any programmed relationships of the data. Thus, the user can obtain visual representations of the impact of varying the variables in the representation. Additionally, the locks and weights provided by the user can include criteria such as iteration-based or time-based cascading, wherein iteration-based cascading places constraints on the recalculation of a selected variable according to how many times the graphical representation has been updated since the last time the selected variable has been modified, and time-based cascading places constraints on the recalculation of a selected variable according to how much time has elapsed since the last time the selected variable has been modified.

The invention also includes a recordable-type medium containing a computer program product for representing data, including instructions for providing a data representation in accordance with defined variables and a functional relationship between the defined variables received from a user, instructions for receiving an assigned weight assigned to a defined variable, and instructions for receiving a modification of a selected defined variable to provide a modified variable. Instructions for providing a further data representation in accordance with a recalculation of an unselected defined variable based upon the functional relationship, the assigned weight and the modified variable are also included.

DETAILED DESCRIPTION

Figure 1:
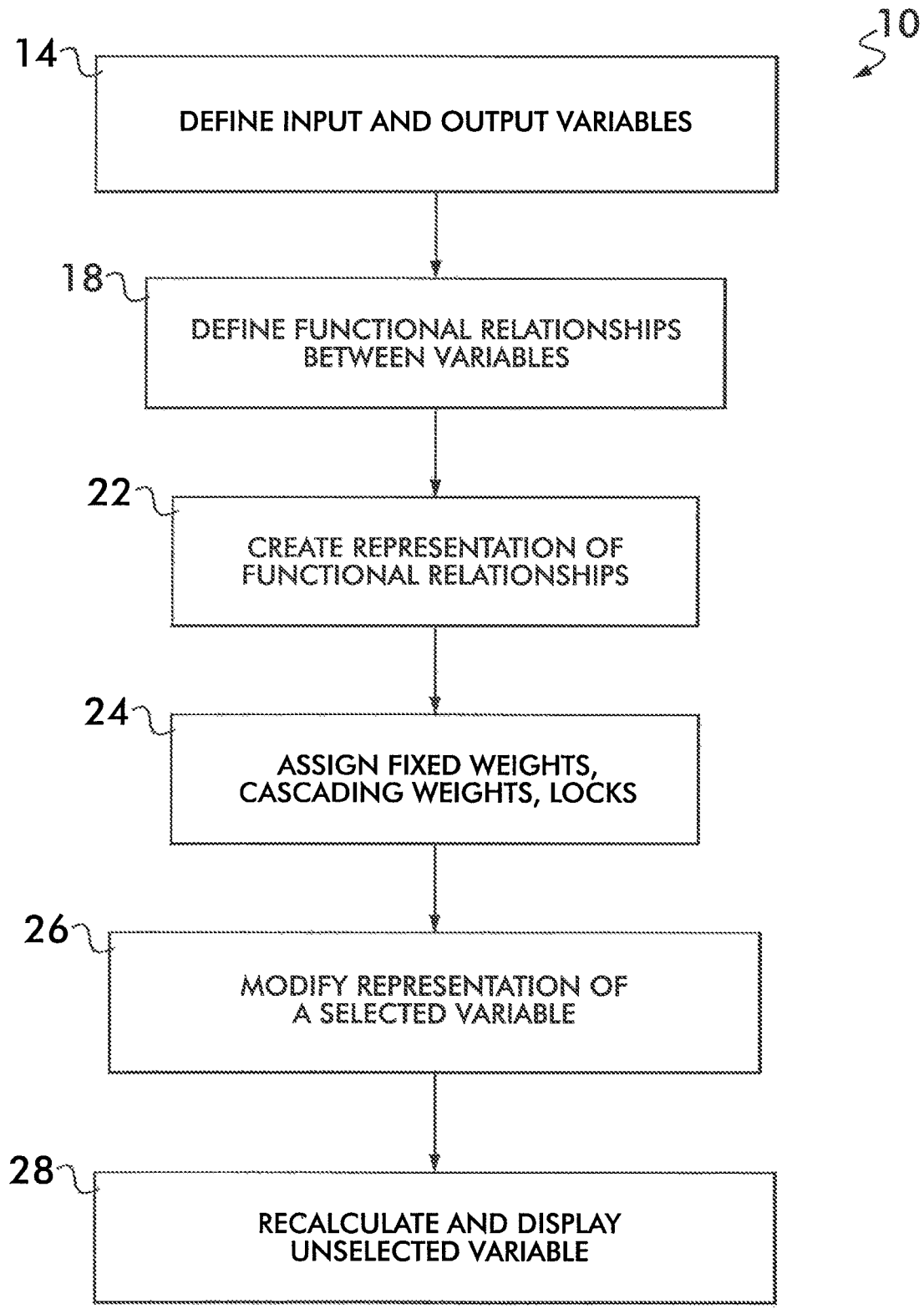
FIG. 1 shows a high level flow diagram representation of an embodiment of the cascading weights editing method of the invention.

Referring now to FIG. 1, there is shown a high level flow diagram representation of an embodiment of the cascading weights data representation editing method 10. In the data representation editing method 10, a user can define the input variables and the output variables of the relationships to be represented, as shown in block 14. The input and output variables defined in block 14 can represent any kind of data.

The user can also define the functional relationships between the variables, as shown in block 18. The functional relationships defined in block 18 can be any types of functional relationships known to those skilled in the art. In one preferred embodiment, the user can indicate which of the variables provided in block 14 are dependent and which variables are independent. For example, time can be defined to be an independent input variable, and distance or velocity can be defined to be dependent output variables. Any equation expressing a Newtonian relationship between the input time and the output distance or velocity can be entered as a functional relationship in block in block 22. Thus, a graphical relationship of the time since a ball has been dropped from a window and the distance it has traveled or its velocity can be received in blocks 14, 18, 22.

The user can also create a representation of the functional relationships, as shown in block 22. The representations created in block 22 can be any types of representations known to those skilled in the art for representing the variables and the relationships between the variables. The types of representations created in block 22 of the data representation editing method 10 can include, but are not limited to, graphical representations such as bar charts, pie charts, spider charts, radar charts, star charts, and spreadsheets, including n-dimensional charts generated by spreadsheets or other application software charting functions. The types of graphical representations that can be created in block 22 can also include, Gantt charts, CAD/CAM graphical images, and maps that link graphical charts to physical locations, including topographical or contour maps and heat maps. The data representation editing method 10 can also be used on the simulation engine graphical outputs of three-dimensional objects that are constructed from modifiable input points.

A graphical chart or other type of representation created according to block 22 of the editing method 10 can have representations of as many different variables as required or convenient. For example, a bar chart created according to block 22 can have individual bars for graphically representing as many of the variables defined in block 14 as desired. Additionally, the user can define as many different relationships between the variables as required or convenient using block 18.

The user can assign weights, including cascading weights, as shown in block 24. Cascading weights are changing weights that can be assigned to the variables defined in block 14 by the user to variables defined in block 14 based on when a variable was last modified. For example, the parameters upon which the changes in the cascading weights can be based can include, but are not limited to, editing iterations (to provide iteration-based weights) or periods of time (to provide time-based weights).

If the cascading weights are iteration-based weights, the weight assigned to a selected variable can change according to the number of editing iterations that have occurred since the last change of the selected variable. Thus, when iteration-based weights are defined by the user, the selected variable can have one weight if it was the last variable changed, a different weight if another variable has been changed since it was last changed, yet another weight if two variable changes have occurred since it was last changed, and so on, as defined by the user. Accordingly, in iteration-based weighting the weighting of a selected variable during a recalculation performed to provide a new data representation can depend on the number of times the user has modified the data representation since the last time the selected variable was modified.

If the cascading weights are time-based weights, the user can assign weights to a selected variable, wherein the assigned weights can vary according to a period of time since the selected variable was last changed. Thus, when time-based weights are defined by the user, the selected variable can have one weight if it was changed within the last day, and a different weight if a week has passed since it was previously changed, and so on, for as many time periods as the user may want to define. Accordingly, the weighting of a selected variable during a recalculation performed to provide a new data representation can depend on the period of time since a previous calculation of the selected variable.

In an alternate embodiment, the weights of a selected variable can vary according to the number of times other variables have been changed since the selected variable was last changed. The weights can also depend on which variables have been changed since the selected variable was last changed. Iteration-based weighting and time-based weighting are described in more detail below.

Furthermore, variables can be assigned fixed weights or ranges over which they may vary, and variables can be locked to prevent them from being recalculated during the operations of block 28. Moreover, the foregoing weighting methods can be combined in any manner. Thus, some variables can be assigned iteration-based weights while, simultaneously, other variables can be assigned weights according to the period of time since they were last changed. Still other variables can simultaneously be assigned fixed weights or ranges, or locked. In one embodiment of the invention, the weight of a variable can depend upon the number of iterations that have occurred since some other variable has been changed, or upon the period of time since some other variable has been changed. Alternately, the weight can depend upon the type of change of a variable. Thus, for example, one weight can be assigned if a variable has increased, and a different weight can be assigned if the variable has decreased or undergone some other type of change.

The user can also graphically modify the chart by moving a graphical representation of a selected variable or variables on the chart as shown in block 26. The representations of the selected variable or variables can be moved, for example, by clicking and dragging them using a mouse. Additionally, the chart can be graphically modified using any other methods known to those skilled in the art. As the user moves the representations of the selected variables, one or more unselected variables can be recalculated according to the system and method of the invention, using the definitions and relationships provided by the user in blocks 18, 22. As shown in block 28 of the data representation editing method 10, the recalculated variable or variables can then be displayed on the chart.

As previously described, the display according to block 28 can also be a spreadsheet display. When the display is a spreadsheet display, user defined entries in the spreadsheet can be recalculated and displayed within the spreadsheet according to the functional relationships defined in block 18 of the data representation editing method 10. Additionally, the modifications according to block 26 can be performed within either a spreadsheet or a graphical chart, and the new display calculated according to block 28 can be performed in either or both mediums.

The assignments of weights and locks to variables in block 24 can place constraints on how variables are recalculated in block 28, in response to modifications of the chart or other representations performed according to block 26. For example, some variables can be locked to prevent them from changing in response to modifications in the chart according to block 26. This may force other variables to change in ways that are different from the ways they would change if the variables are not locked. Additionally, variables may be permitted to change only within certain user selected ranges in response to modifications of the chart by assigning weights to the variables. This may force other variables to change in ways that are different from the ways they would change if the variables are not restricted to the user-selected ranges. In a preferred embodiment of the invention, the weights assigned to variables can be adjusted according to how many times the chart has been modified since the variables were modified. The uses of weights, iteration-based weights and locks are described in more detail below.

Figure 2A:
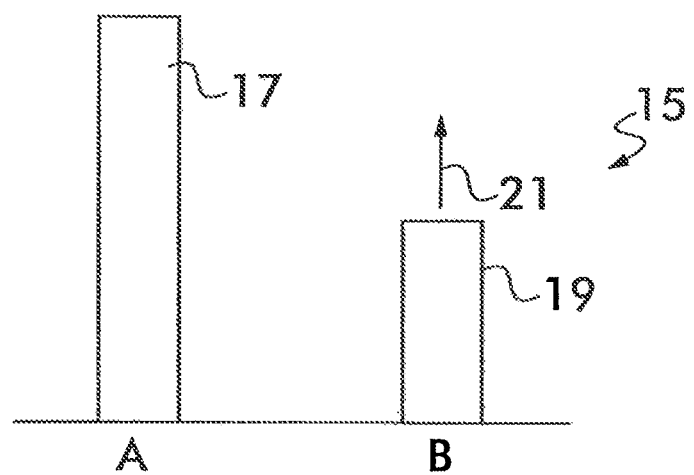
FIGS. 2A, B show prior art graphical representations that can be created and edited according to the embodiment of the invention shown in FIG. 1.

Referring now to FIGS. 2A, B, there are shown the prior art bar graph representations 15, 25 for illustrating a method of modifying a graphical representation. A user can define a variable A and represent it as bar 17 on the graphical representation 15. A variable B can be represented by a bar 19 on the graphical representation 15. The user can then define a functional relationship between the variables A and B, for example A=2×B.

Figure 2B:
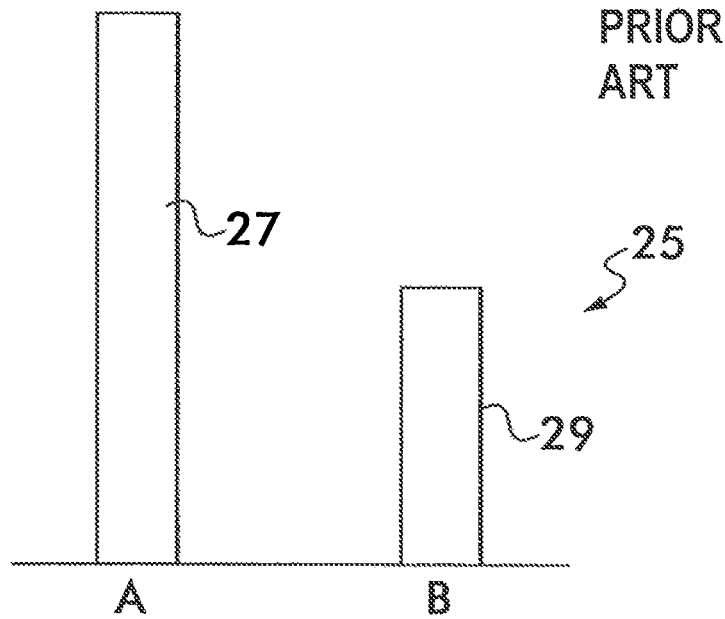

The user can then click on the bar representing the variable B and drag it upwards to indicate an increase is the value of variable B, as shown by the arrow 21 of FIG. 2A. As the size of bar 19 representing variable B is increased by dragging it upward on bar 19, the value of A can be recalculated. Thus, the size of bar 17 representing variable A can increase twice as much as bar 19 representing variable B as bar 19 is dragged upward. The result is shown in the bar graph representation 25 of FIG. 2B. In the bar graph representation 25 both bars 27, 29 are larger than the corresponding bars 17, 19 in bar graph representation 15, and bar 27 representing A is twice as large as bar 29 representing B. It will be understood that the portions of the charts that are modified using the editing method 10 can be modified using this technique or any other techniques in addition to the click and drag technique. However, using the method described with respect to the prior art bar graph representations 15, 25, the bar representing A will always be twice as large as the bar representing B, no matter how many times the representations 15, 25 are modified. The prior art bar graph representations 15, 25 do not, however, permit users to place specific constraints on how the recalculated portions of charts can change in response to alterations of other portions of the graphical representation other than the constraints placed by the functional relationships between the variables.

A user can use the data representation editing method 10 to graph the relationships between the data that are important to running a simple widget business. The owner of the widget business may sell twenty widgets per day, where the variable Number Per Day is understood to represent the number of widgets sold by the owner in a day. The Cost Per Widget may be $5 each, and the owner may sell the widgets for a Price Per Widget of $10. Thus, the owner's Revenue Per Day based on the foregoing values can be the Number Per Day×the Price Per Widget=20×$10=$200 per day.

The Profit Per Day for the owner under these circumstances can be the Revenue Per Day−Total Costs=(Number Per Day×the Price Per Widget)−(Number Per Day×Cost Per Widget)=(20×$10)−(20×$5)=$200−$100=$100. In this manner, the owner can define the inputs and outputs of the relationship, and the relationships between them, as shown in blocks 14, 18 of the data representation editing method 10.

Figure 3A:
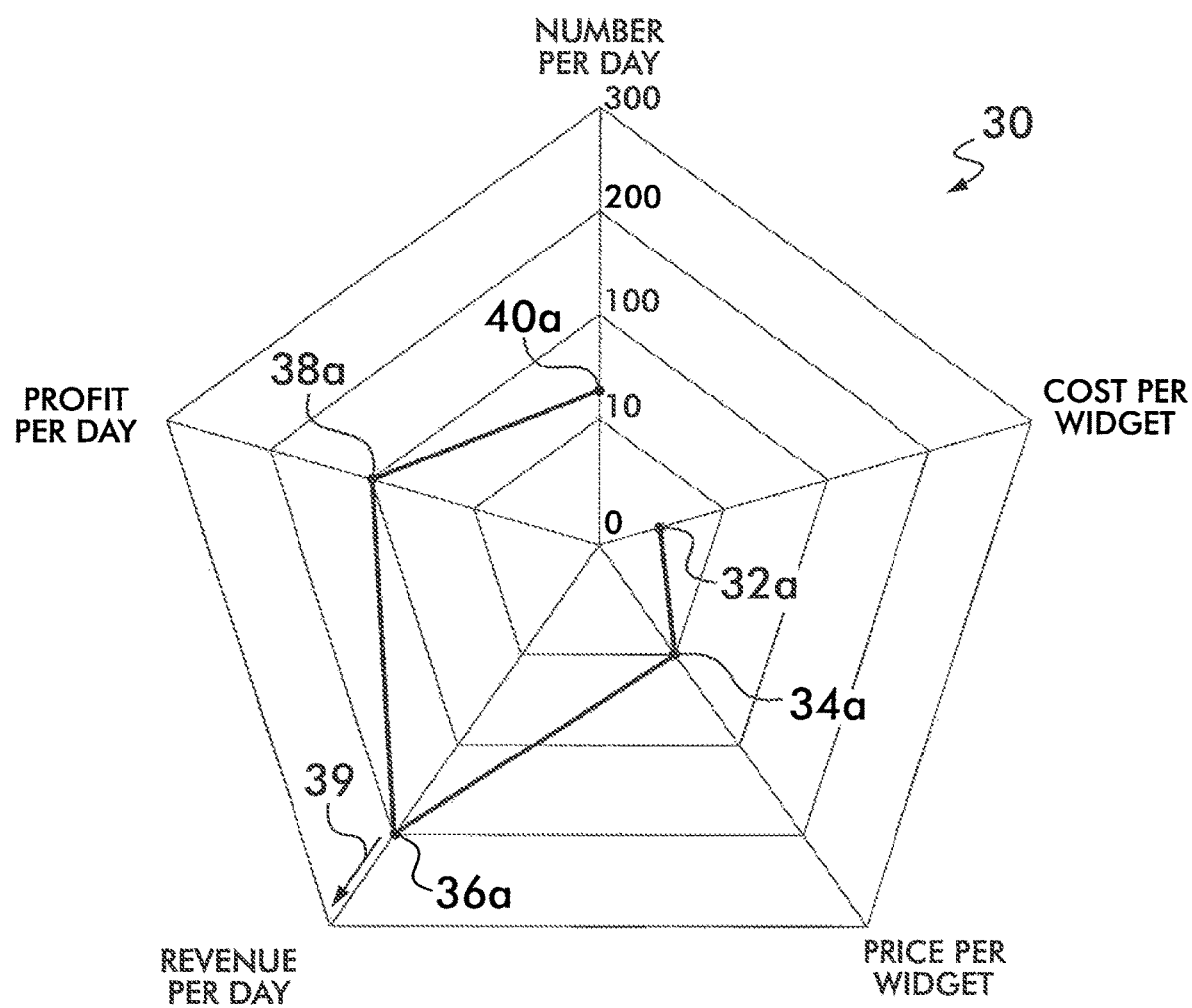
FIGS. 3A, B, C show graphical representations that can be created and edited according to the embodiment of the invention shown in FIG. 1.

Referring now to FIGS. 3A, B, C, there are shown the graphical representations 30, 45, 60, respectively. The graphical representations 30, 45, 60 are spider chart representations of the variable relationships and values of the foregoing widget business example, which can be created and modified according to the data representation editing method 10. Spider charts are used in the graphical representations 30, 45, 60 for illustrative purposes only, since spider charts can provide useful two-dimensional representations of the relationships between two or more quantitative variables. However, any other types of graphs or charts capable of representing the variables and the relationships of the widget business can be used. In the spider charts of the graphical representations 30, 45, 60, each variable can be represented on its own non-linear axis, and all of the axes can have a common origin. In an alternate embodiment, not shown, the axes of a spider chart edited according to the data representation editing method 10 can be linear.

Thus, the graphical representation 30 includes an axis for the Cost Per Widget, an axis for the Price Per Widget, an axis for the Revenue Per Day, an axis for the Profit Per Day, and an axis for the Number Per Day. Accordingly, in the graphical representation 30, the owner executing block 22 of the data representation editing method 10, can graphically represent the $5 Cost Per Widget at point 32a. The Price Per Widget of $10 can be represented at point 34a. The $200 Revenue Per Day can be represented at point 36a. The $100 Profit Per Day can be represented at point 38a, and the twenty widgets sold per day can be represented at point 40a on the Number Per Day axis of the graphical representation 30.

Figure 3B:
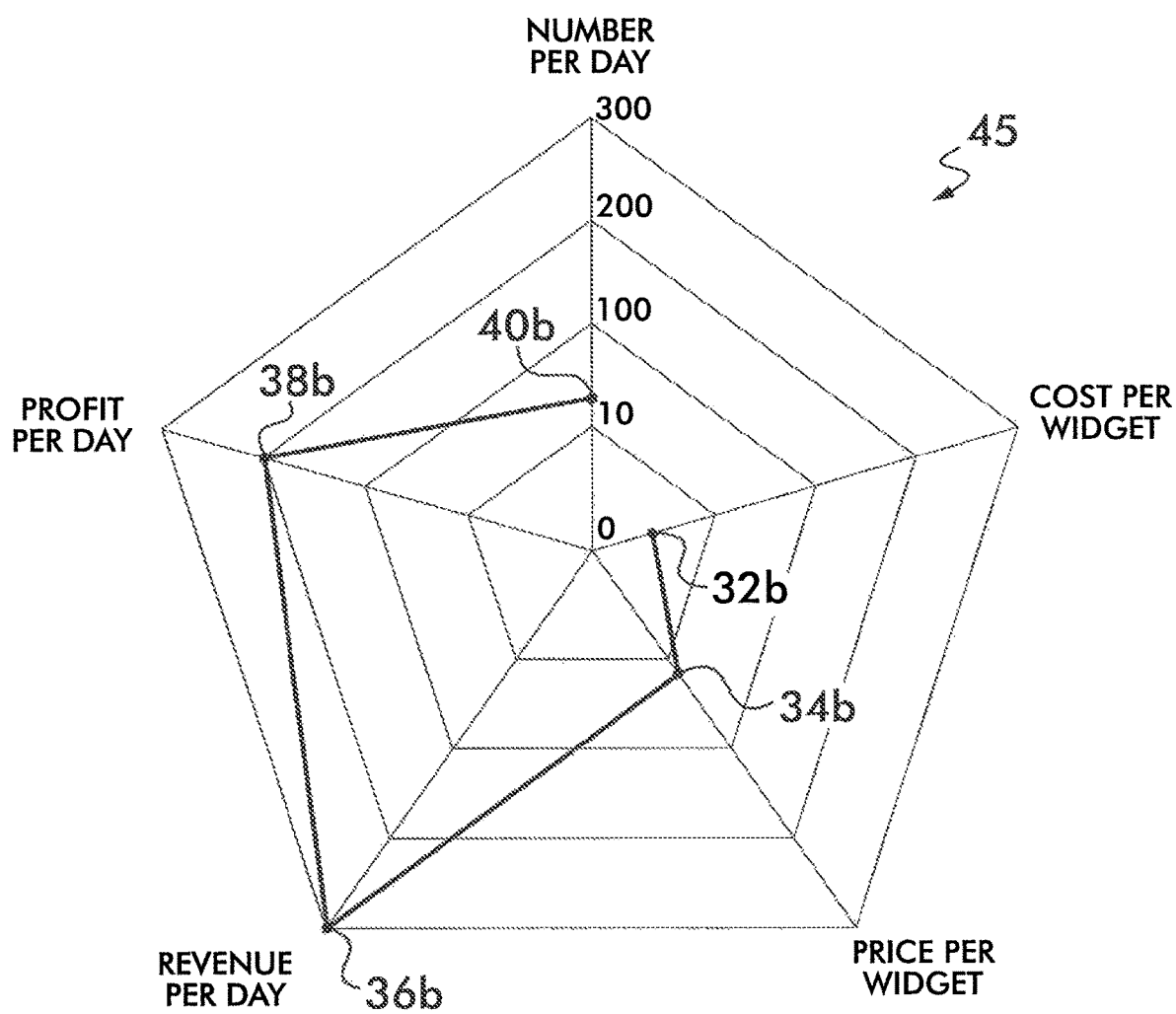

The owner of the widget business can use the data representation editing method 10 to determine how the remaining variables can change in order to increase the Revenue Per Day from, for example, $200 to $300. For example, the owner can click the mouse on point 36a (on FIG. 3A), and drag it in the direction indicated by arrow 39, to point 36b, as shown in graphical representation 45 in FIG. 3B. In a preferred embodiment of the invention, the user can do this whether the Revenue Per Day is defined to be an input variable or an output variable. Thus, the data representation editing method 10 can calculate the input values required to provide an output value created by user-modifications of a graphical representation, as well as calculating the output values produced by user-modifications of input variables.

As previously described with respect to block 24, the owner of the business can assign locks to selected variables. For example, the owner can designate the Cost Per Widget to be locked at $5, as shown at point 32b in FIG. 3B. Additionally, the Number Per Day can be locked at 20, as shown at point 40b. The editing method 10 can then recalculate the Price Per Widget according to the relationships defined in block 18.

The new Price Per Widget=new Revenue Per Day/Number Per Day=$300/20=$15/widget. Accordingly, the graphical representation 45 can automatically calculate the updated value of the Price Per Widget as $15 and display it at point 34b on the Price Per Widget axis. Furthermore, if the Revenue Per Day is thus raised, and the Cost Per Widget is locked as described, the data representation editing method 10 can recalculate the Profit Per Day according to the foregoing locking: new Profit Per Day=(new Revenue Per Day)−Total Costs=(20×$15)−(20×$5)=$300−$100=$200. Accordingly, the new Profit Per Day is automatically displayed in the graphical representation 45 as $200, as shown at point 38b.

Additionally, as previously described with respect to block 24 of FIG. 1, the owner can assign weights to any of the defined variables. Furthermore, the owner or other users can assign weights to variables based on the probabilities of data values occurring, the number of times the chart has been previously modified according to block 26, the relative importance of the variables as determined by the user, the willingness of the user to allow selected variables to change, or any other criteria the users want to use.

For example, the owner can assign a weight to the Number Per Day and a weight to the Price Per Widget. The first row of data in Table I below shows the case that is represented in the graphical representation 30 in FIG. 3A. In this example, the Number Per Day sold can be locked at 20 by associating the Number Per Day with a weight 1.00 (Weight 1) as shown in the first row. Likewise, the Price Per Widget can be locked at $10. Accordingly, the weight associated with the Price Per Widget is also thus assigned a value of 1.00 (Weight 2). These values of Weight 1 and Weight 2 can be used in the equation Revenue Per Day=(Number Per Day×Weight 1)×(Price Per Widget×Weight 2) in providing point 36b in graphical representation 45.

TABLE I

| Revenue/Day = (Number × Weight 1) × (Price × Weight 2) | | | | |
|---|---|---|---|---|
| Rev/Day | Num/Day | Weight 1 | Price/Widget | Weight 2 |
| $200 | 20 | 1.00 | 10 | 1.00 |
| $160 | 20 | 1.00 | 10 | 0.80 |
| $142 | 20 | 0.95 | 10 | 0.75 |
| $102 | 20 | 0.95 | 10 | 0.60 |

Alternately, the owner using the editing method 10 can define the probability of selling 20 widgets to be 100%, and estimate the probability of selling the widgets at a Price Per Widget of $10 to be 80%. See the second row of data in Table I, wherein Weight 1 corresponding to the Number Per Day has a value of 1.00, and Weight 2 corresponding to Price Per Widget has a value of 0.80. The Revenue Per Day can then be recalculated and displayed as 80% of $200=$160, by the editing method 10. Under these, circumstances, a new spider chart (not shown) could be displayed with a value of $160 on the Revenue Per Day axis.

Furthermore, the owner can use the data representation editing method 10 to explore any other ways of defining, estimating and changing the values of the variables to model the behavior of the business. For example, the third row of data in Table I shows the case where the Weight 1 assigned to selling 20 widgets in a day is 0.95 and the Weight 2 assigned to the price is 0.75. The fourth row of data shows the case where the Weight 1 assigned to selling 20 widgets in a day is 0.95 and the weight 2 assigned to the price is 0.60.

Alternately, the owner or other user may be interested in experimenting with how changes in the cost structure can impact the profits of the business. Under these circumstances, the owner can enable the Cost Per Widget variable to be unlocked, and drag it in the manner previously described. The data representation editing method 10 can then provide displays visualizing the effects of the variations in the Cost Per Widget input variable on the Profit Per Day output variable. See Table II below, which shows how the data representation editing method 10 can be used to calculate data for graphically representing the Profit Per Day as the Cost Per Widget is dragged on a graphical representation.

TABLE II

| Profit/Day = ((Number × Weight 1) × (Price × Weight 2)) − ((Number × Weight 1) × (Cost)) | | | | | |
|---|---|---|---|---|---|
| Profit/Day | # of Widgets | Weight 1 | Price | Weight 2 | Cost |
| $200 | 20 | 1.00 | 10 | 1.00 | 5.00 |
| $110 | 20 | 1.00 | 10 | 1.00 | 4.50 |
| $123.50 | 20 | 0.95 | 10 | 1.00 | 3.50 |
| $112 | 20 | 0.80 | 10 | 1.00 | 3.00 |

Figure 3C:
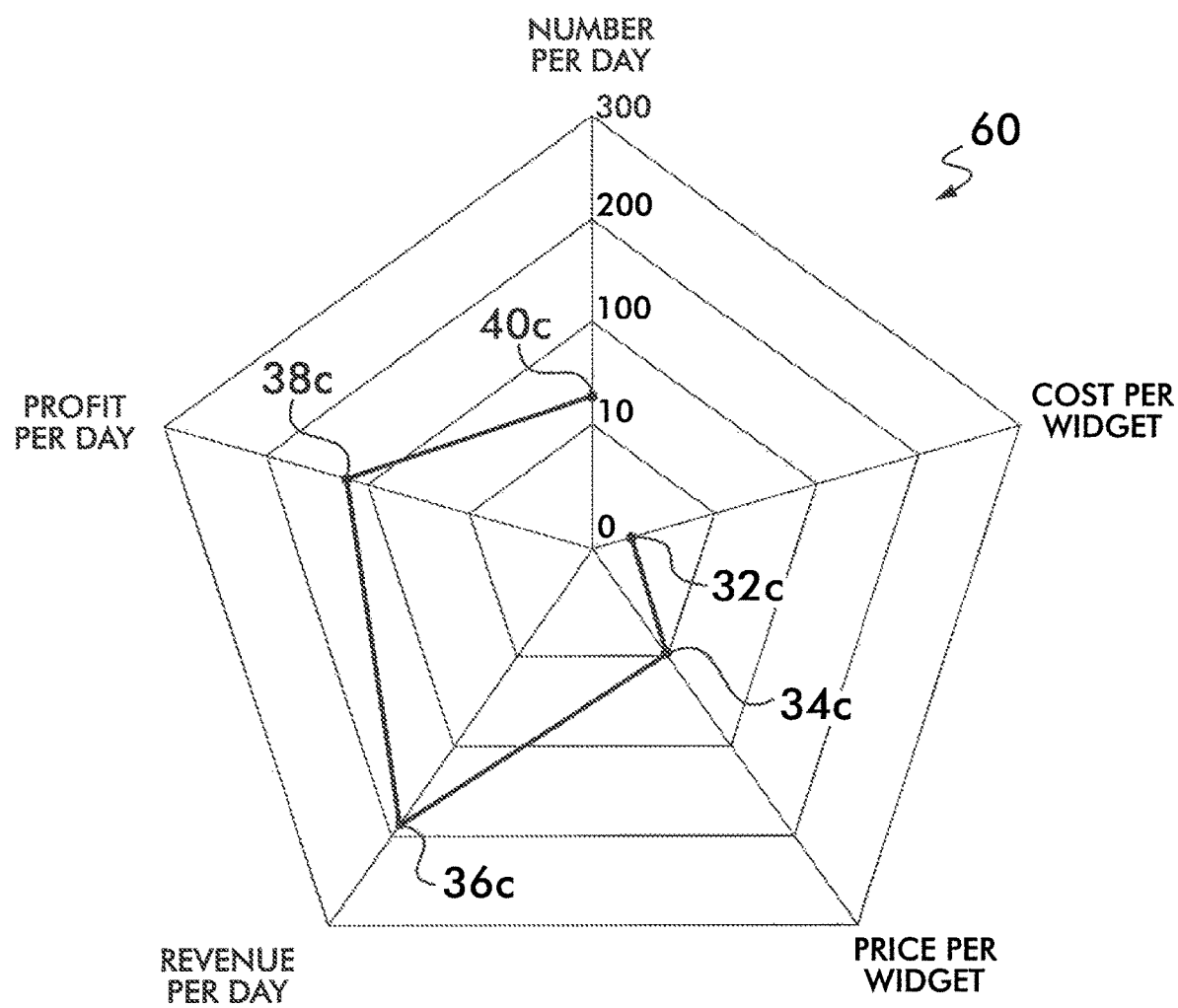

For example, graphical representation 60 of FIG. 3C shows the case where the Profit Per Day is maximized at $123.50, when the Cost Per Widget is $3.50 and the probability of selling 20 widgets is 95%, as set forth in the third row of data in Table II. Under these circumstances the Profit Per Day=(Number Per Day×Weight 1)×(Price Per Widget×Weight 2)−((Number Per Day×Weight 1)×(Cost))=(20×0.95)×(10×1.00)−(20×0.95)×(3.50)=$190−$66.50=$123.50.

Using features such as assigning weights and locks to different numbers of selected variables in the foregoing manner, users can perform many experiments on their data. As one or more output variables are changed, it is possible to hold any or all other output variables the same, and show the changes needed with respect to the input variables. Furthermore, the weights assigned can be based upon when a variable was last modified, as described in more detail below. It is also possible to hold all input variables the same and show the effect on the output variables. Additionally, some variables can be weighted while simultaneously other variables can be locked in order to show the effect on selected input and output variables as desired by the user.

Figure 4:
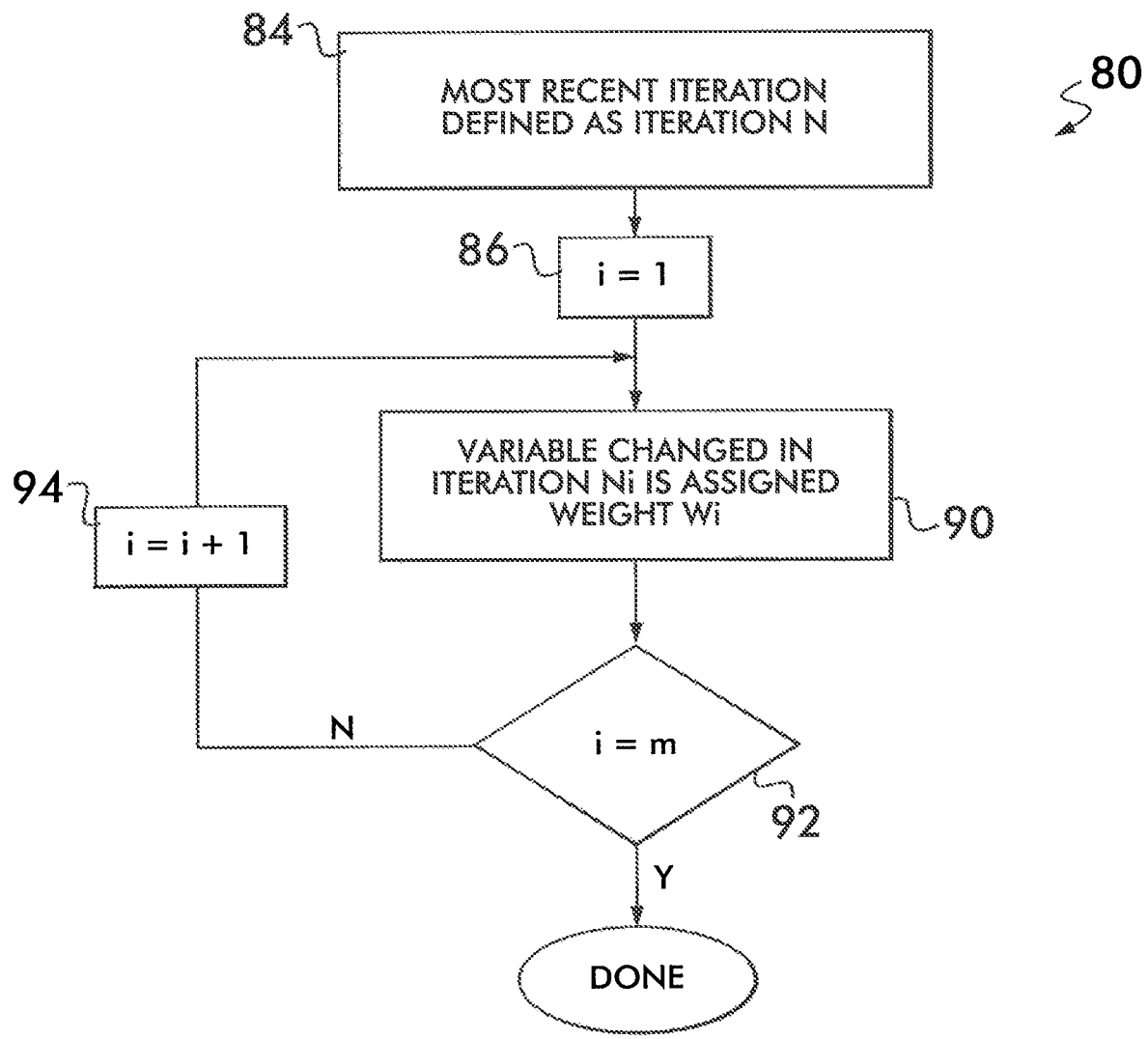
FIG. 4 shows a flow chart representation of an embodiment of an iteration-based weighting method for use in the editing method of FIG. 1.

Referring now to FIG. 4, there is shown a flow chart representation of an embodiment of an iteration-based weighting method 80. The iteration-based weighting method 80 is a method for assigning weights or locks to variables when iteratively performing chart modifications according to the data representation editing method 10. In the iteration-based weighting method 80, the values of different variables can be changed during a series of iterations, and the weights assigned to the variables can be adjusted according to the iterations in which they are changed.

For example, if the most recent iteration in an iterative series is defined to be iteration $N_1$, the variable changed in iteration $N_1$ can have a Weight $W_1$ the next time the chart is modified and the variables are recalculated. If the last iteration before iteration $N_1$ is defined to be iteration $N_2$, the variable changed in iteration $N_2$ can be assigned a Weight $W_2$, wherein $W_1$ is not necessarily equal to $W_2$. This process can be performed for the last m iterations, wherein the user can define any number m of weights desired. Additionally, the user can assign any values of weights desired for any of the iterations. This relationship is illustrated in Table III below for a series of m iterations.

TABLE III

| Number of Iterations To Be Weighted | Iteration Definition | Weight Assigned |
|---|---|---|
| 1 | $N_1$ | $W_1$ |
| 2 | $N_2$ | $W_2$ |
| 3 | $N_3$ | $W_3$ |
| ... | ... | ... |
| m | $N_m$ | $W_m$ |

For example, in one possible embodiment of the invention, the variable that was changed in the most recent iteration $N_1$ can be assigned of Weight $W_1=0$, meaning that it is not permitted to change at all in the next iteration. The variable that was changed in the next most recent iteration $N_2$, in this embodiment, can be assigned a Weight $W_2=0.40$ The next most recently changed variable, changed during iteration $N_3$, can be assigned a weight of 1.00, meaning that it can change in any way permitted according to the functional relationships defined in block 18 of the data representation editing method 10. All variables changed prior to iteration $N_3$ can also be permitted to change in any way permitted according to the functional relationships defined in block 18.

Thus, during execution of block 28 of the data representation editing method 10, execution of the iteration-based weighting method 80 can begin with block 84 of the iteration-based weighting method 80. In block 84 the most recent iteration of the editing method 10 is defined as iteration $N_1$. An index i is set to 1 in block 86, and the variable that was modified in iteration $N_1$ is assigned a Weight $W_1$. If the index i is not equal to the number of iterations m to be weighted, as determined in decision 92, the index i is incremented in block 94 and execution of the iteration-based weighting method 80 proceeds back to block 90. When all of the variables to be assigned weights have received their weights, execution of the iteration-based weighting method 80 is complete. In this way a predetermined sequence of weights can be assigned to the corresponding variables that are changed during successive iterations of the editing method 10.

Note that any of the Weights $W_1$ to $W_m$ can be equal to each other, different from each other, or have any other logical or arithmetic relationships to each other defined by the user. Furthermore, the Weights $W_1$ to $W_m$ can be arbitrarily defined by the user to have no logical or arithmetic relationships to each. Additionally, in one preferred embodiment the user can vary the Weights $W_1$ to $W_m$ and/or the relationships between them at any time while modifying a chart according to the data representation editing method 10.

For example, the user can define a sequence of values of Weights $W_1$ to $W_m$ to decrease or increase by a fixed increment, by nonuniform increments, or in any other way for a first series of iterations. The weights defined in this manner can be assigned in sequence to modified variables. The user can then specify a different fixed increment, different nonuniform increments, or in other way in a subsequent series of increments, and assign the new weights in series to the modified variables.

Figure 5:
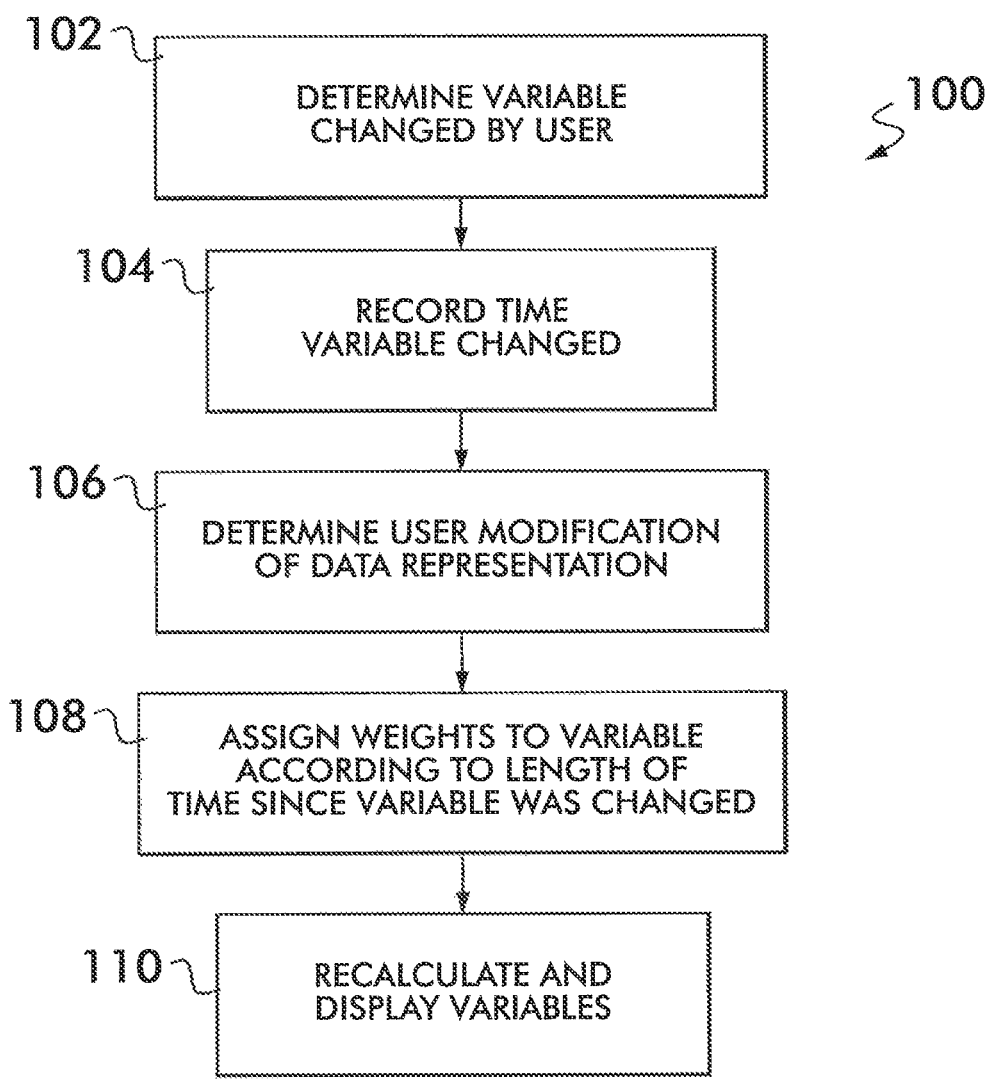
FIG. 5 shows a flow chart representation of an embodiment of a time-based weighting method for use with the editing method of FIG. 1.

Referring now to FIG. 5, there is shown a flow chart representation of an embodiment of a time-based weighting method 100. The time-based weighting method 100 can be used with the data representation editing method 10. As shown in block 102, in the time-based weighting method 100 a determination can be made each time the user changes a variable according to block 26 of the editing method 10. As shown in block 104, the time of each change is recorded. When the user makes a change in the data representation, as determined in block 106, weights can be assigned to the variables before recalculating the variables in preparation for a new display. The weights assigned to a selected variable can be determined by the user according to the length of time since the variable has been changed, as shown in block 108.

Thus, the selected variable can be assigned one weight if it was changed within the last day, and another weight if it has not been changed for a week. A third weight can be assigned to the variable if the variable was altered within a third time period. Thus, a series of different weights can be assigned to a variable according the times when it was last modified. Alternately, the variable can be assigned different weights according to the length of time since some other variable has been changed, or the length of time since it or another variable has been changed more than a predetermined amount.

While the invention has been described in detail and with reference to specific examples thereof, it will be apparent to one skilled in the art that various changes and modifications can be made therein without departing from the spirit and scope thereof.

What is claimed is:

1. A method, comprising:
providing a first data representation of a plurality of variables;
locking a first variable of the plurality of variables, wherein the locked, first variable is not modified; and
determining a second data representation of the plurality of variables based upon a recalculation of a second variable of the plurality of variables, wherein the recalculation is constrained by the locked, first variable and by a weight assigned to the second variable, and wherein the assigned weight is assigned by:
   in response to determining that an iteration-based weight is to be assigned, assigning a first value to the weight when the second variable is a last variable modified, a second value to the weight when a third variable has been modified since the second variable was last modified, and a third value to the weight when multiple variables have been modified since the second variable was last modified,
   in response to determining that a time-based weight is to be assigned, assigning a fourth value to the weight according to a first period of time since the second variable was last modified and a fifth value to the weight according to a second period of time since the second variable was last modified, and
   in response to determining that a type-based weight is to be assigned, assigning a sixth value to the weight based on an increase of a value of the second variable and a seventh value to the weight based on a decrease of the value of the second variable.

2. The method of claim 1, further comprising:
determining another data representation of the plurality of variables in accordance with a recalculation of another weighted variable based upon a weight selected from a plurality of weights in accordance with a previous modification of the another weighted variable.

3. The method of claim 2, wherein the recalculation of the another weighted variable is in accordance with a number of modifications performed since the previous modification of the another weighted variable.

4. The method of claim 1, further comprising:
selecting another variable from among the plurality of variables that is defined as one of a dependent variable and an independent variable.

5. The method of claim 4, further comprising:
locking at least one of the dependent variable and the independent variable.

6. The method of claim 1, wherein the first data representation is a graphical representation.

7. A computer-implemented system, comprising:
a processor; and
a memory device coupled to the processor, wherein the memory device includes an application, which when executed by the processor, includes:

providing a first data representation of a plurality of variables;

locking a first variable of the plurality of variables, wherein the locked, first variable is not modified; and determining a second data representation of the plurality of variables based upon a recalculation of a second variable of the plurality of variables, wherein the recalculation is constrained by the locked, first variable and by a weight assigned to the second variable, and wherein the assigned weight is assigned by:

in response to determining that an iteration-based weight is to be assigned, assigning a first value to the weight when the second variable is a last variable modified, a second value to the weight when a third variable has been modified since the second variable was last modified, and a third value to the weight when multiple variables have been modified since the second variable was last modified, in response to determining that a time-based weight is to be assigned, assigning a fourth value to the weight according to a first period of time since the second variable was last modified and a fifth value to the weight according to a second period of time since the second variable was last modified; and in response to determining that a type-based weight is to be assigned, assigning a sixth value to the weight based on an increase of a value of the second variable and a seventh value to the weight based on a decrease of the value of the second variable.

8. The computer-implemented system of claim 7, wherein the application, which when executed by the processor, further includes:

determining another data representation of the plurality of variables provided in accordance with a recalculation of another weighted variable based upon a weight selected from a plurality of weights in accordance with a previous modification of the another weighted variable.

9. The computer-implemented system of claim 8, wherein the recalculation of the another weighted variable is in accordance with a number of modifications performed since the previous modification of the another weighted variable.

10. The computer-implemented system of claim 7, wherein the application, which when executed by the processor, further includes:

selecting another variable from among the plurality of variables that is defined as one of a dependent variable and an independent variable.

11. The computer-implemented system of claim 10, wherein the application, which when executed by the processor, further includes:

locking at least one of the dependent variable and the independent variable.

12. The computer-implemented system of claim 7, wherein the first data representation is a graphical representation.

13. A non-transitory recordable-type medium containing a computer program product, comprising:

instructions for providing a first data representation of a plurality of variables;

instructions for locking a first variable of the plurality of variables, wherein the locked, first variable is not modified; and instructions for determining a second data representation of the plurality of variables based upon a recalculation of a second variable of the plurality of variables, wherein the recalculation is constrained by the locked, first variable and by a weight assigned to the second variable, and wherein the assigned weight is assigned by:

in response to determining that an iteration-based weight is to be assigned, assigning a first value to the weight when the second variable is a last variable modified, a second value to the weight when a third variable has been modified since the second variable was last modified, and a third value to the weight when multiple variables have been modified since the second variable was last modified, in response to determining that a time-based weight is to be assigned, assigning a fourth value to the weight according to a first period of time since the second variable was last modified and a fifth value to the weight according to a second period of time since the second variable was last modified, and in response to determining that a type-based weight is to be assigned, assigning a sixth value to the weight based on an increase of a value of the second variable and a seventh value to the weight based on a decrease of the value of the second variable.

14. The non-transitory recordable-type medium containing the computer program product of claim 13, further comprising:

instructions for determining another data representation of the plurality of variables in accordance with a recalculation of another weighted variable based upon a weight selected from a plurality of weights in accordance with a previous modification of the another weighted variable.

15. The non-transitory recordable-type medium containing the computer program product of claim 14, wherein the recalculation of the another weighted variable is in accordance with a number of modifications performed since the previous modification of the another weighted variable.

16. The non-transitory recordable-type medium containing the computer program product of claim 13, further comprising:

instructions for selecting another variable from among the plurality of variables that is defined as one of a dependent variable and an independent variable.

17. The non-transitory recordable-type medium containing the computer program product of claim 16, further comprising:

instructions for locking at least one of the dependent variable and the independent variable.

18. The non-transitory recordable-type medium containing the computer program product of claim 13, wherein the first data representation is a graphical representation.

* * * * *